United States Patent
LaBoda

[11] 3,801,028
[45] Apr. 2, 1974

[54] MACHINE FOR MAKING TWISTED WIRE BEADS FOR TIRES

[75] Inventor: John Albert LaBoda, Fairview Park, Ohio

[73] Assignee: Advance Manufacturing Corporation, Cleveland, Ohio

[22] Filed: Oct. 21, 1971

[21] Appl. No.: 190,753

[52] U.S. Cl. ............... 242/4 BE, 152/362, 156/136, 156/422
[51] Int. Cl. ........................................... H01f 41/08
[58] Field of Search ......... 242/4 BE, 4 C, 4 R, 7.02, 242/6, 7.22, 4 B; 156/422, 136; 245/1.5; 57/13, 14, 15, 9, 3, 160, 161

[56] References Cited
UNITED STATES PATENTS

| | | | |
|---|---|---|---|
| 3,132,816 | 5/1964 | Oshima | 242/4 C |
| 1,610,468 | 12/1926 | Pullets | 252/6 UX |
| 2,196,463 | 4/1940 | Holleran | 242/4 BE |
| 1,294,160 | 2/1919 | Pratt | 245/1.5 |
| 3,158,980 | 12/1964 | Carter | 57/13 |
| 3,558,068 | 1/1971 | Albrecht | 242/7.22 |
| 1,415,828 | 5/1922 | Pratt | 57/21 |

Primary Examiner—Billy S. Taylor
Attorney, Agent, or Firm—Bosworth, Sessions & McCoy

[57] ABSTRACT

A method and machine for making wire beads for tires wherein the beads comprise one or more wire filaments helically wrapped around a solid metal core ring. The metal core ring is of circular cross section and is supported in a holding mechanism that includes inner and outer endless belts which revolve the core ring about its axis of symmetry while at least one length of filaform material is wrapped around it in a helical path about the circular axis defined by the center of the core ring cross section. The pitch of the helical wrap is adjusted to place each convolution of the filament in a predetermined spaced relation to the next preceeding convolution. Thus, a plurality of convolutions are provided on the core ring with a single filament.

1 Claim, 6 Drawing Figures

FIG. 1
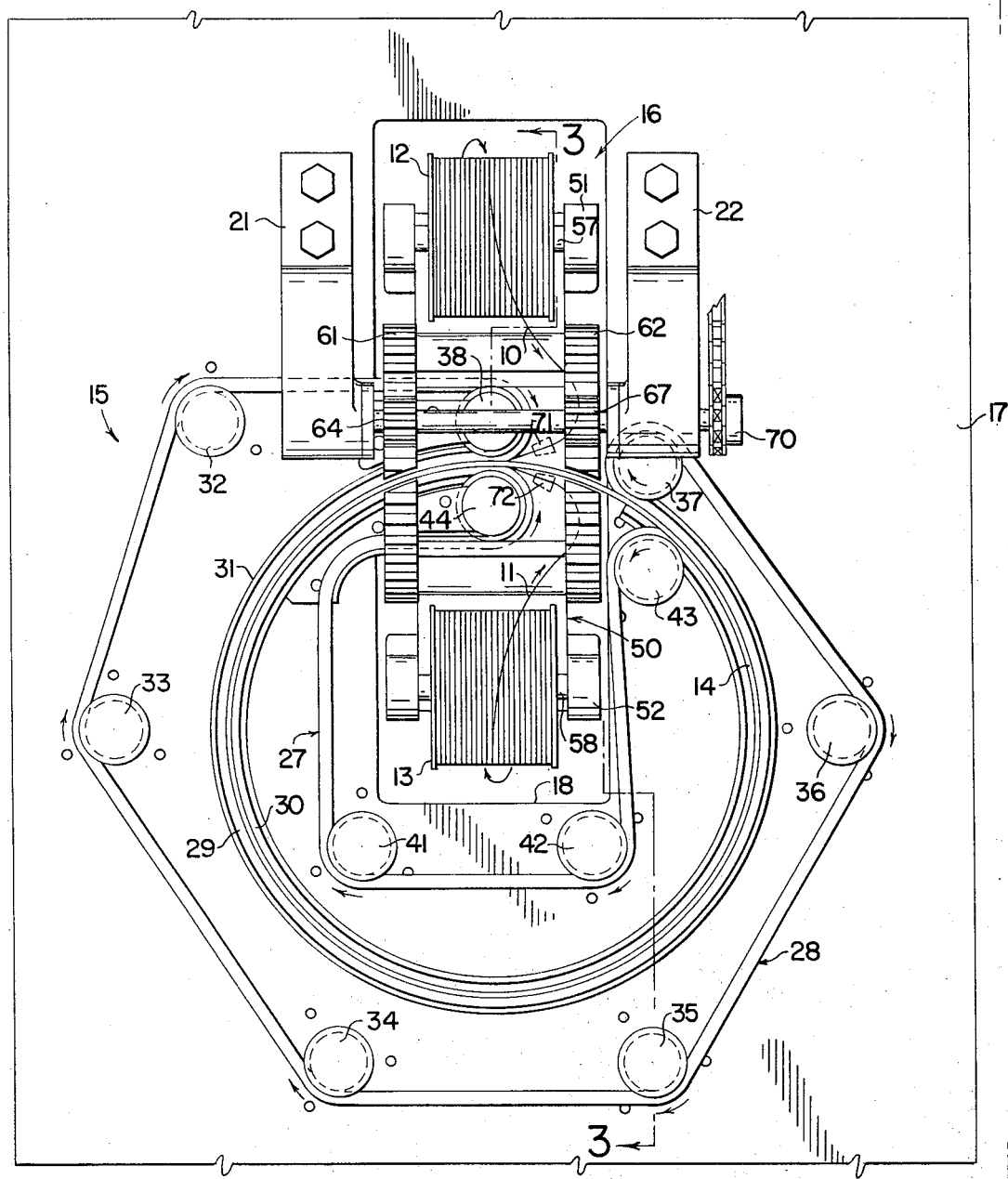
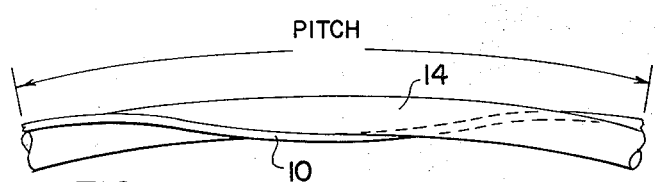
FIG. 5
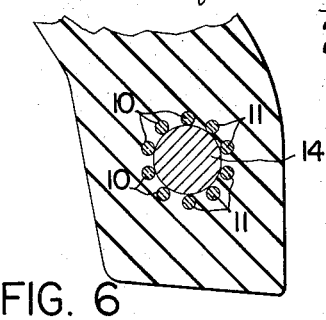
FIG. 6

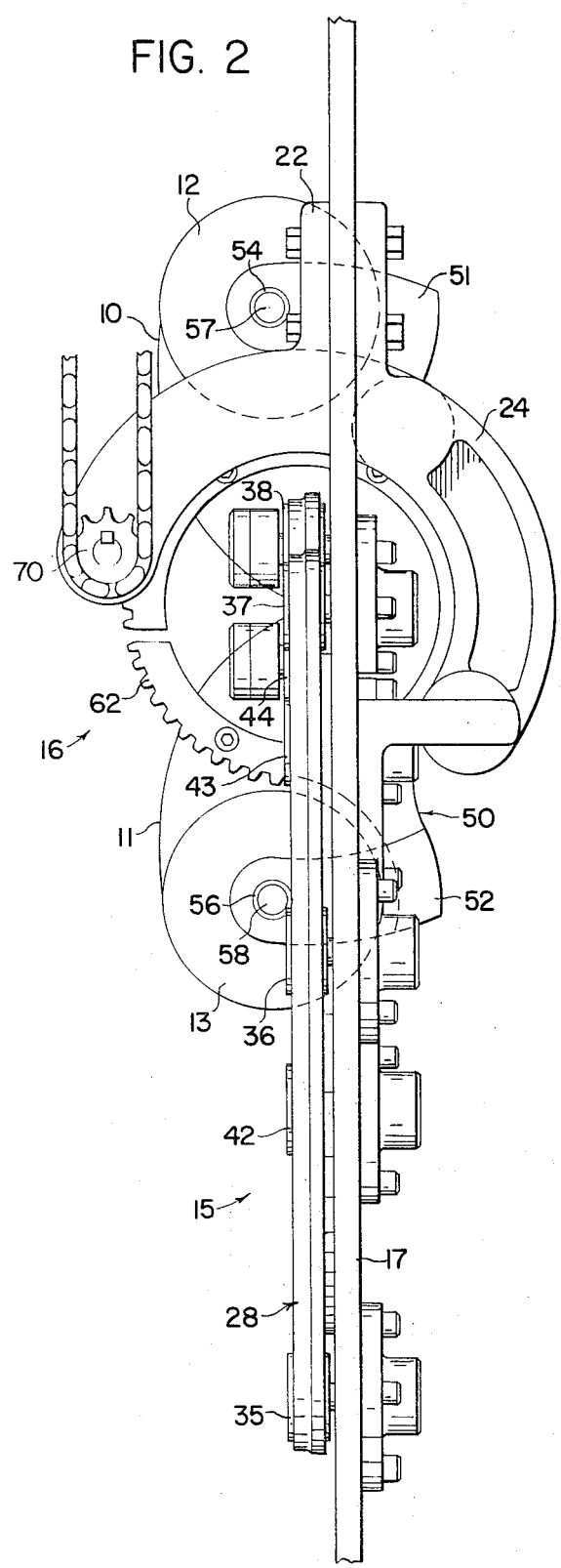
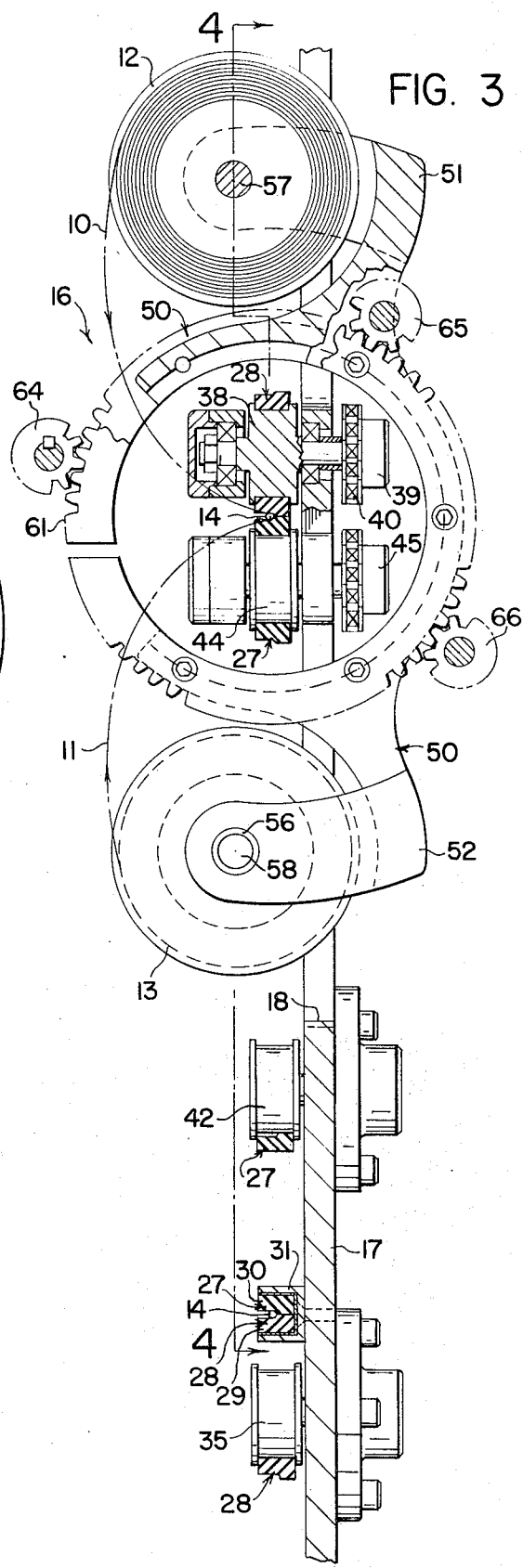

3,801,028

MACHINE FOR MAKING TWISTED WIRE BEADS FOR TIRES

BACKGROUND OF THE INVENTION

This invention relates to the manufacture of metal bead rings for pneumatic tires and more particularly to bead rings comprising filaform elements helically wound or wrapped about a circular core member. More particularly, the invention relates to a method, machine and product thereof, for making such multi-wrapped filaform beads where the helices are uniformly spaced about the circular axis defined by the core ring and wound with each filament making several successive convolutions completely around the circumference of the ring.

In the manufacture of pneumatic tires, a metal bead ring is generally applied to opposite ends of a number of superposed plies of rubber-coated fabric wrapped around a cylindrical tire building drum. The ends of the fabric plies are turned up over the rings which are ultimately embedded in rubber between the plies to form the beads of the vulcanized pneumatic tire. While many types of both multi-filament and mono-filament bead rings have been used, current practices favor multi-filament beads due to their superior strength and flexibility. Furthermore, it is desirable that the filament have a helical wrap about the circular axis of symmetry defined by the cross section of the bead, in order to provide for some resilient radial expansion of the bead ring as well as for other resilient flexing.

The cross sectional form of the bead is also an important factor, a fairly smooth form being desirable in order to reduce the possibility of tearing or cutting of the plies by sharp edges of the bead. A better securing of the bead to the rubber is achieved where the cross section of the bead is irregular rather than completely round. Accordingly, it is desirable to have a bead formed of filaments helically wrapped about a circular axis of symmetry and circumferentially spaced apart to define helical grooves therebetween for anchoring the rubber plies to the bead ring. Furthermore, it is desirable that the wire filaments be of long lengths sufficient for several convolutions, rather than of short lengths extending only one convolution and requiring the connecting together of the ends of each length for each complete loop.

One such type of helically wrapped multi-filament bead ring utilizes a circular core ring about which the outer filaments are helically wrapped while another type is of coreless construction and formed, for example, in the manner described in U. S. Pat. No. 3,251,384. The present invention is directed to the manufacture of helically wrapped multi-filament solid core type bead rings.

In the past such bead rings have been manufactured slowly and laboriously and have required that the ends of each circumferential convolution about the core ring of the helically wrapped wire be welded or brazed together thus producing a non-uniform and somewhat weakened structure. Also some prior art techniques have produced an axial twist in the wire filaments thus causing a tendency of the wire to "unwind."

The method, apparatus and article of the present invention, however, reduce the difficulties inherent in the prior art and afford other features and advantages heretofore not obtainable.

SUMMARY OF THE INVENTION

It is among the objects of the invention to wrap a filament helically about the circular axis defined by a core ring, through one or more complete circumferential convolutions around the ring.

Another object is to uniformly space adjacent convolutions of a filament that is helically twisted about a circular axis defined by a core ring, through several circular circumferential loops around the ring.

A further object is to provide a bead ring for pneumatic tires that has a plurality of helically wrapped filaments uniformly circumferentially spaced from one another to define helical grooves therebetween in order to achieve an interlocking effect with the rubber-coated fabric carcass plies of a pneumatic tire.

Still another object is to produce a bead ring for pneumatic tires of the type defined wherein the helically wrapped filaments are free of any axial twist.

These and other objects are accomplished by wrapping one or more continuous lengths of filamentary material through a plurality of circumferential convolutions about a circular core ring in a helical path by holding the core ring and revolving it about its axis of symmetry. The holding and revolving is accomplished by engaging the surface of the core ring throughout a major circumferential portion thereof but leaving a free circumferential fixed span through which the ring is progressively transported. At least one supply spool is carried in an orbiting assembly that is moved in an orbital path about an axis tangent to the core ring in the circumferential span and through the ring itself in such a manner as to continuously feed wire filament to the surface of the ring in the circumferential span. Accordingly, as the core ring is advanced, the filament is helically wrapped around it through a plurality of circumferential loops or convolutions in such a manner as to space each convolution uniformly from the next proceeding convolution about the cross sectional circumference of the ring until the desired number of convolutions has been obtained.

BRIEF DESCRIPTION OF THE DRAWINGS

FIG. 1 is a front elevation of an apparatus embodying the invention;

FIG. 2 is a side elevation on an enlarged scale taken from the line 2—2 of FIG. 1;

FIG. 3 is a fragmentary sectional view on a still larger scale taken on the line 3—3 of FIG. 1;

FIG. 5 is a fragmentary elevational view illustrating a portion of a core ring with one full wrap of helically wound filament placed thereon; and FIG. 6 is a fragmentary sectional view showing a bead ring made according to the invention and embedded in a pneumatic tire.

DESCRIPTION OF THE PREFERRED EMBODIMENT

Figure 4:
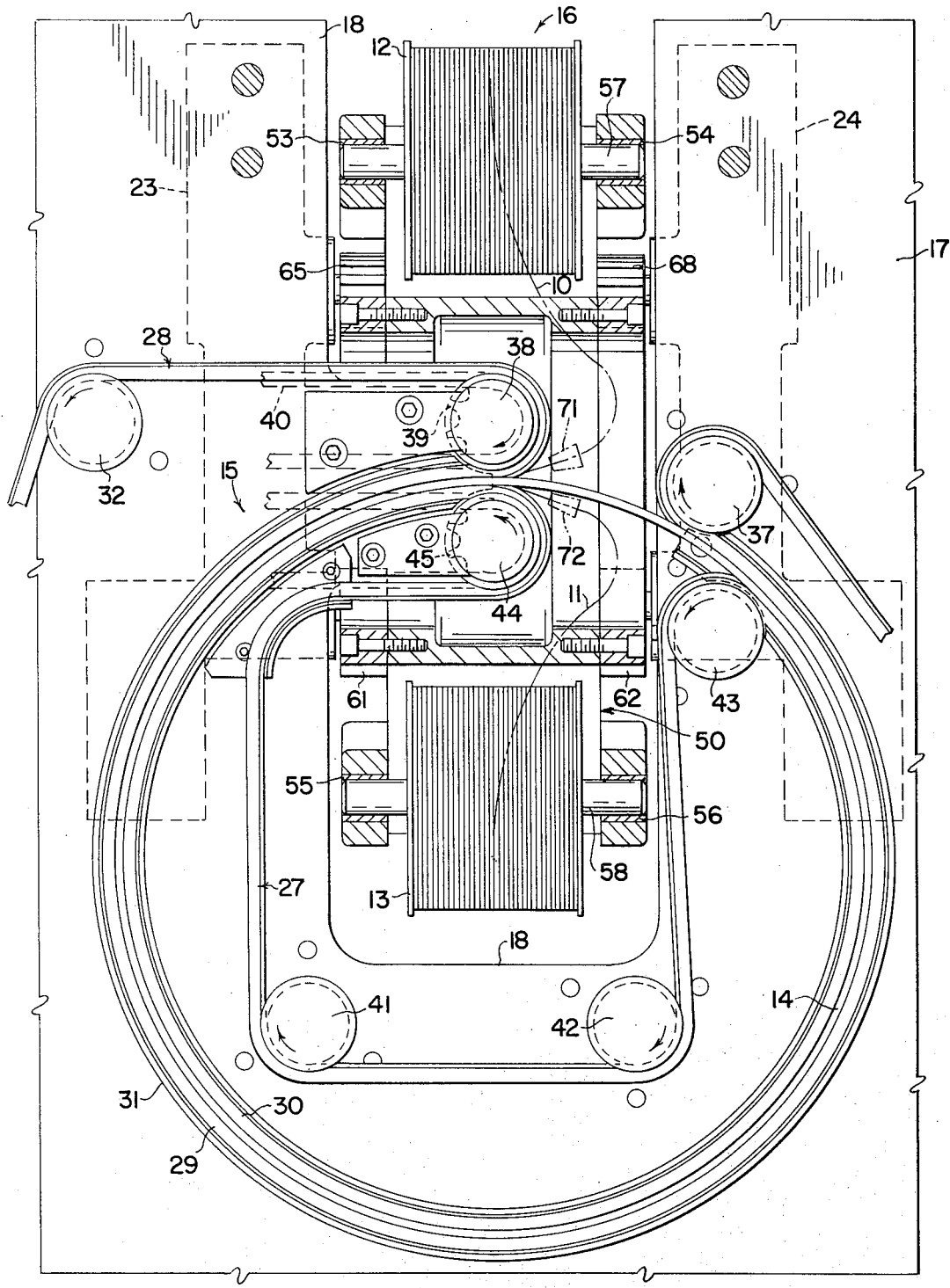
FIG. 4 is a fragmentary sectional view taken on the line 4—4 of FIG. 3.

Referring more particularly to the drawings and initially to FIG. 1, there is shown an apparatus for wrapping two lengths 10 and 11 of wire filament fed from a pair of supply spools 12 and 13, respectively, about a core ring 14 that is supported and turned about its axis of symmetry by a core ring rotary drive assembly 15. The core ring 14 is formed, for example, of 0.110 inch diameter steel wire and the lengths 10 and 11 of wire filament are of 0.050 inch diameter steel wire. The spools 12 and 13 are carried by an orbital wire feed assembly 16 and the rotary drive assembly 15 is mounted on a vertical mounting plate 17 having an opening 18 to accommodate the rotation of the orbital wire feed assembly 16.

The orbital wire feed assembly 16 is supported for rotation about a horizontal axis tangent to the core ring 14 by means of two brackets 21 and 22 mounted on the front of the vertical mounting plate 17 and two other brackets 23 and 24 mounted on the rear of the plate.

The core ring 14 is supported and turned about its axis of symmetry by means of an endless inner belt 27 and an endless outer belt 28, which grip the core ring therebetween throughout central circular spans 29 and 30 thereof respectively in which the belts 27 and 28 are guided by means of a circular track 31 of U-shaped cross section that has its floor bolted to the front face of the vertical mounting plate 17 as best seen in FIG. 3. To reduce sliding friction, the inner surface of the circular track 31 is provided with a coating of a low-coefficient-of-friction plastic material such as a polyolefin.

The track 31 does not define a continuous circle but has a discontinuous section, the ends of which define the locations for the entry and exit of the endless belts 27 and 28 at the opposite ends of the respective circular spans 29 and 30, thereof. Between the ends of the circular spans, the core ring 14 is freely exposed in order to permit the wrapping thereon of the lengths 10 and 11 of wire filament, as best seen in FIG. 1, the outer belt 28 is guided through an outer return span by pulleys including six idler pulleys 32, 33, 34, 35, 36 and 37 and a drive pulley 38 which is driven through a sprocket 39 on the rearward face of the vertical mounting plate 17. The sprocket 39 is driven by a chain 40 from the output sprocket of a drive motor (not shown).

After the endless inner belt 27 advances past the exit portion of its circular span 30, it is guided through a return span by four pulleys including idler pulleys 41, 42 and 43 and drive pulley 44 driven by a sprocket 45 at approximately the same speed as the drive pulley 38. Thus, both of the endless belts 27 and 28 are driven across their respective circular spans 29 and 30 at the same rate of speed to carry the core ring 14 around its circular path of travel about its own axis of symmetry with an exposed portion thereof adapted to receive the two lengths 10 and 11 of wire filament being continuously fed at the inlet portion of the circular spans.

The orbital wire feed assembly 16 includes a spool carriage 50 of generally circular form and adapted to rotate about an axis tangent to the core ring 14 at the point where the core ring enters the respective circular spans 29 and 30 of the endless belts 27 and 28. The carriage 50 has a pair of oppositely spaced bifurcated extensions 51 and 52, the forked portions of which have bearings 53, 54, 55 and 56, respectively, in which the shafts 57 and 58 of the spools 12 and 13 are journalled. Thus, the spools 12 and 13 are carried in an orbital path through the opening 18 in the vertical mounting plate 17 and are free to turn relative to the spool carriage 50 as the wire lengths 10 and 11 are unwound therefrom.

Bolted to each side of the spool carriage 50 and concentric therewith are split helical gears 61 and 62 as best shown in FIG. 3. The split portion of the gears 61 and 62 permits the core ring to be inserted through the gear as is necessary to mount it in the core ring rotary drive assembly 15.

Each of the helical gears 61 and 62 is engaged by three pinions 64, 65 and 66 and 67, 68 and 69, respectively, the pinions 64 and 67 being journalled in the front brackets 21 and 22, respectively, and the pinions 65, 66 and 68 and 69 being journalled in the rear brackets 23 and 24, respectively. The pinion 67 has a sprocket 70 mounted on the end of its shaft on the opppsite side of the bracket 22, the sprocket 70 being driven by a chain from the drive motor from which the driving force for the spool carriage 50 is derived. The wires 10 and 11 are guided radially inward toward the axis of the spool carriage 50 and are then directed from their radial travel to a generally axial travel by means of wire guides 71 and 72 which serve to feed the wires 10 and 11 to the surface of the core ring 14 diametrically spaced from one another. This is accomplished without any axial twisting of the wire.

In the embodiment shown, the core ring 14 is turned through five complete turns about its axis of symmetry so that each wire filament 10 and 11 completes five complete convolutions about the ring. The pitch of each of the wires is controlled by adjusting the orbit speed of the spool carriage 50 relative to the speed of the endless belts 27 and 28 in their circular spans 29 and 30 such that at the completion of each turn of the core ring 14 the wire is spaced relative to the next proceeding convolution exactly 36° therefrom to provide the configuration shown in FIG. 6. Once the five turns are completed, the wire is cut at the appropriate location to abut the oreceeding trailing end and is then brazed, soldered, clipped or welded to the core ring.

While the invention has been shown and described with respect to a specific embodiment thereof, this is intended for the purpose of illustration rather than limitation and other variations and modifications will be apparent to those skilled in the art upon a reading of the specification. Accordingly, the patent is not to be limited to the specific embodiment herein shown and described nor in any other way that is inconsistent with the extent to which the progress in the art has been promoted by the invention.

I claim:

1. A machine for making flexible bead rings for automobile tires by wrapping continuous lengths of stiff wire helically around the surface of an endless circular core ring comprising:

a pair of endless belts including an inner belt and an outer belt, each with a core-ring-gripping span, guide means defining a major circumferential portion of a circle and having ends defining therebetween an open span representing the remaining minor portion of said circle, said guide means being adapted to receive and support said core-ring-gripping spans of said belts in said major circumferential portion wherein said core-ring-gripping span of said inner belt engages and grips the interior circumferential surface portion of said core ring and said core-ring-gripping span of said outer belt engages and grips the exterior circumferential surface portion of said core ring whereby said core ring and wire previously wrapped therearound are tightly gripped between said inner and outer endless belts, means for driving said belts to revolve said core ring about its axis of symmetry to transport successive portions of said core ring and wire previously wrapped therearound, progressively across said open span, a spool of stiff wire supported for rotation about its axis, guide means for continuously directing said wire from said spool to the surface of said core ring in said open span, and means for orbiting said spool and said guide means about an axis tangent to said core ring in said open span, whereby as said core ring is revolved, said wire is unwound from said spool and progressively wrapped helically around the surface of said core ring, the initial contact between said core ring and said wire occuring essentially at the point of tangency between said orbit axis and said core ring.

* * * * *